Oct. 17, 1944.  J. E. CLICKNER  2,360,761
DETACHABLE COUPLING
Filed May 15, 1942

INVENTOR.
JAMES E. CLICKNER
BY
ATTORNEY

Patented Oct. 17, 1944

2,360,761

UNITED STATES PATENT OFFICE 2,360,761

DETACHABLE COUPLING

James E. Clickner, Dearborn, Mich., assignor to The Flex-O-Tube Company, a corporation of Delaware Application May 15, 1942, Serial No. 443,026

2 Claims. (Cl. 285—84)

This invention relates to detachable couplings for flexible hose and has for its primary object the providing of a simple, inexpensive and effective two piece detachable coupling wherein maximum gripping of the hose by anchorage of the hose within the coupling member may be accomplished without deleterious effect upon the hose.

Another object of the invention is to provide a detachable hose coupling for flexible hose wherein maximum gripping occurs at the point within the fitting where minimum tensile and flexural stress may be developed in the hose.

A further object of the invention is to provide a detachable hose coupling for flexible hose of the type in which the hose is gripped between an outer shell and inner stem wherein the innermost portion of the hose is gripped with a vise-like biting engagement leaving the outermost portion of the hose within the shell under firm but less rigorous grip whereby to gain the advantage of maximum anchorage of the hose within the coupling member without the usual cutting and tearing of the hose when subjected to repeated tensile and flexural stresses.

Other objects of the invention will become apparent by reference to the following detailed description taken in connection with the accompanying drawing, in which.

Figure 1:
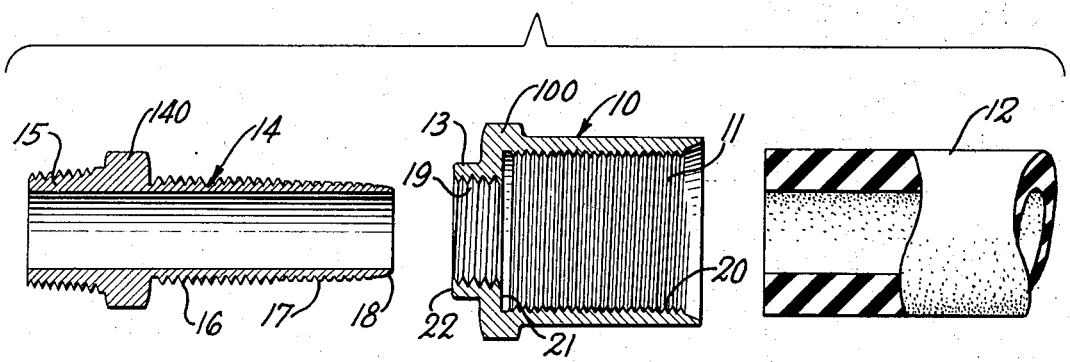
Fig. 1 is an exploded longitudinal sectional view of a detachable flexible hose coupling embodying the invention disassembled from a piece of flexible hose shown therewith.
Figure 2:
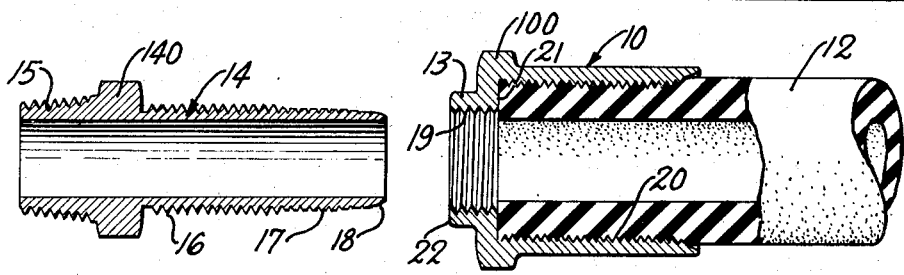
Fig. 2 is a partially exploded longitudinal sectional view similar to Fig. 1 showing the flexible hose assembled in the shell of the detachable coupling.
Figure 3:
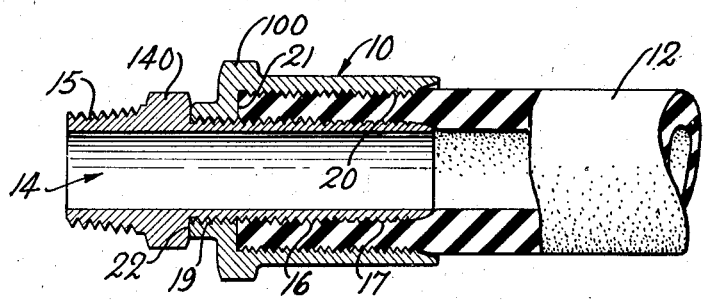
Fig. 3 is a longitudinal sectional view of the detachable hose coupling disclosed in Figs. 1 and 2 completely assembled on the end of a flexible hose.

Referring now to the drawing wherein like numerals refer to like and corresponding parts throughout the several views, the particular hose coupling selected to illustrate the invention comprises a shell member 10 internally threaded at 11 which accommodates the end of a hose 12 and having an internally threaded neck portion 13 which receives an externally threaded hollow stem member 14 which is proportioned and threaded as hereinafter described in detail. The internal diameter of the hollow stem member 14 is as large as possible to give a minimum of restriction to flow of fluids therethrough. The shell member 10 is preferably provided with a hexagonal wrench grip 100 and the stem member 14 is preferably provided with a hexagonal wrench grip 140 by means of which the hose coupling may be assembled onto the hose 12. The stem member 14 outwardly of the wrench grip 140 is shown as a male pipe coupling 15, however, any desired coupling element or the like may be substituted for the coupling element 15 shown.

The portion of the stem member 14 which extends into the shell member 10 is provided with a full depth coarse thread 16 adjacent the wrench grip 140 and is provided with a flattened partial depth coarse thread 17 near the end thereof which is tapered to an annular blunt nose 18. The foregoing threads are provided by turning the stem member 14 to the desired diameter and taper, and then threading the same with a full depth die which provides the threads 16 and 17 with a single threading operation. The threads 19 of the internally threaded neck 13 of the shell member 10 are complementary to the full depth threads 16 of the shell member 10, both the full depth threads 16 and flattened threads 17 of the stem member 14 being operatively engageable therewith. The internal threads 20 of the shell member 10 are preferably opposite hand with respect to the internal threads 19 of the internally threaded neck 13 of the said shell member 10 whereby to admit of assembly of the coupling member onto the hose 12.

To assemble the coupling member 10 onto the hose 12, the shell member 10 is first threaded onto the end of the said hose 12 until the end of the said hose 12 is in firm abutment against the annular face 21 at the inner extremity of the shell member 10. The stem member 14 is then threaded into the internally threaded neck 13 of the shell member 10 until the wrench grip 140 comes in contact with the annular end 22 of the said neck member 13. During this latter assembly operation, the stem 14 is threaded gradually into the inner end of the hose 12, first with a firm pressure developed between the internally threaded shell member 10 and the externally half depth threaded end 17 of the stem member 14, and then with a vise-like biting grip to provide absolute anchorage of the innermost end of the hose 12 between the internally threaded shell member 10 and the externally full depth threaded portion 16 of the stem member 14.

Thus, the hose 12 is positively held at the innermost portion of the shell member 10 in a vise-like biting grip type anchorage, and, at the outer portion of the shell member 10, the hose 12 is engaged within the shell member 10 by a firm grip with no extreme biting of the shell threads 20 into the outside of the hose and no biting whatsoever of the stem member 14 into the inside of the hose. This admits of the flexing and tensioning of the hose with respect to the coupling member without deleterious effects, and, at the same time, positive anchorage of the hose 12 within the shell member 10 is assured axially inwardly of the end of the shell member 10 and inwardly of the zone of greatest stress on the hose and the zone of likelihood of rupture of the hose.

Although but one embodiment of the invention has been disclosed and described in detail, it is obvious that many changes may be made in the size, shape, arrangement and details of the various elements of the invention without departing from the scope thereof as defined by the appended claims.

I claim:

1. In a detachable coupling for flexible hose, an internally threaded shell member, a centrally apertured base integral therewith and an internally threaded neck on said base, a flexible resilient hose threaded into said shell member and into abutment with said base, an externally threaded hollow stem member including a wrench grip and coupling element at one end and having the other end formed blunt and provided with a coarse thread of full depth nearest said wrench grip and flattened to partial depth at the outer portion thereof, the said blunt end of said stem member being threaded through said threaded neck into the bore of said flexible resilient hose within said shell member first gripping the said hose lightly through engagement of said partial depth threads therewith and finally anchoring the inner end of said hose within said shell member with a vise-like biting engagement through engagement of said full depth threads therewith.

2. In a detachable coupling for flexible hose, an internally threaded shell member, a centrally apertured base integral therewith and an internally threaded neck portion on said base, a resilient flexible hose received in said shell member, and a hollow stem member including a wrench grip and coupling element at one end and formed blunt and threaded at the other end into and through the internally threaded neck of said shell member into engagement with the said resilient flexible hose anchoring the said hose between the said shell member and said stem member, the threads of said stem member being of uniform coarse pitch full depth at the portion thereof nearest said wrench grip and flattened at the outer portion thereof whereby to engage and anchor the said hose with a positive vise-like biting grip at the innermost portion of said shell through engagement of said full depth threads therewith and engage the said hose with a lighter grip at the outermost portion of the said shell through engagement of said flattened threads therewith to admit of flexing of the hose with respect to the said shell member without deleterious effect on said hose.

JAMES E. CLICKNER.